United States Patent [19]

Boe et al.

[11] Patent Number: 4,931,967
[45] Date of Patent: Jun. 5, 1990

[54] CONTROL SYSTEM CALIBRATION

[75] Inventors: Thomas E. Boe, Grundy County; Mark A. Bergene; Carl E. Kittle, both of Cedar Falls; Gregory E. Sparks, Waterloo, all of Iowa

[73] Assignee: Deere & Company, Moline, Ill.

[21] Appl. No.: 294,537

[22] Filed: Jan. 6, 1989

[51] Int. Cl.⁵ .......................................... A01B 63/112
[52] U.S. Cl. ........................ 364/571.01; 364/424.07; 172/3; 172/7
[58] Field of Search ...................... 364/571.01, 571.08, 364/551, 424.07; 172/2, 3, 7, 9

[56] References Cited

U.S. PATENT DOCUMENTS

| | | | |
|---|---|---|---|
| 2,921,638 | 1/1960 | Shane | 172/9 |
| 3,455,397 | 7/1969 | Nelson et al. | 172/9 |
| 3,757,868 | 9/1973 | Gregerson | 172/9 |
| 3,913,680 | 10/1975 | Carlson | 172/2 |
| 4,173,259 | 11/1979 | Heckenkamp | 172/7 |
| 4,495,577 | 1/1985 | Strunk et al. | 364/424.07 |
| 4,503,916 | 3/1985 | Wiegardt | 172/3 |
| 4,508,176 | 4/1985 | Wiegardt et al. | 172/7 |
| 4,518,044 | 5/1985 | Wiegardt et al. | 364/424.07 |
| 4,677,542 | 6/1987 | Kasten | 172/9 |
| 4,837,691 | 6/1989 | Boe et al. | 172/7 |

FOREIGN PATENT DOCUMENTS 1503592 3/1978 United Kingdom.

OTHER PUBLICATIONS

"Rockshaft and Implement Hitches", 1980, TM-1199, pp. 270-25-1 through 270-25-12.
"Electronic Draft Control System", pp. 67-75, date unknown.
"Model GZ-10 Gozinta Sensor", 1986, 4 pages, Revere Corp.
"A New Load Sensor for Truck Self Weighing Systems", J. D. Barnett & R. West, 1983, pp. 33-39.
"TPH Operating Information", pp. 12-1 to 12-8, 1986, Steiger.
"Hitch Control Adjustment", 1987, pp. 12-13 and 9, Caterpillar.

Primary Examiner—Gary Chin

[57] ABSTRACT

A microprocessor-based control system includes an automatic calibration and configuration feature. A calibration and configuration algorithm operates to establish the sensor ranges of all sensors installed and disables certain configurable features if the associated sensors are not present. The algorithm also provides a functional test of the control system during the calibration process.

1 Claim, 2 Drawing Sheets

Microfiche Appendix Included
(2 Microfiche, 140 Pages)

CONTROL SYSTEM CALIBRATION

This application includes a microfiche appendix including 2 microfiche and 140 frames.

A portion of the disclosure of this patent document contains material which is subject to a claim of copyright protection. The copyright owner has no objection to the facsimile reproduction by anyone of the patent document or the patent disclosure as it appears in the Patent and Trademark Office patent file or records, but otherwise reserves all other rights whatsoever.

This invention relates to a method or system for calibrating an "on-vehicle" control system, such as a hitch control system, for controlling the working depth of a tractor-coupled implement as a function of various sensed and operator-controlled parameters.

Vehicle related electronic control systems typically allow more flexibility in their configuration than do the mechanical control systems they replace. This requires some means to define the system configuration of the vehicle. In addition, electronic sensing devices need to be calibrated so that each sensing device has a voltage range which is known so that the relation between input voltage and the actual parameter value can be determined. Most electronic systems accomplish the system configuration by use of DIP switches which must be set manually when the control system is installed. The input voltage range is established by defining a "typical" value and then adjusting the input sensor manually to ensure that the sensor output matches the predefined input range.

A second method of calibration and configuration of an on-vehicle electronic system is to plug into a special calibration computer which can "down load" calibration and configuration data to the controller. Although this second solution works well at the place of original manufacture, it requires expensive special equipment at any repair center.

SUMMARY OF THE INVENTION

An object of the present invention is to provide an electronic hitch control system with automatic calibration and configuration capabilities.

Another object of the present invention is to provide such a calibration capability which does not require extra equipment or manual sensor adjustment.

These and other objects are achieved by the present invention which includes a microprocessor which executes a hitch control algorithm and a calibration and configuration algorithm.

The calibration and configuration algorithm operates to establish the sensor ranges of all sensors installed and disables certain configurable features if the associated sensors are not present. The algorithm also provides a functional test of the control system during the calibration process. No special equipment, which is not already a part of the control system, is required.

During calibration, a step by step procedure is followed which causes the control system to operate the hydraulic valves so that the hitch can be raised and lowered through its full range. Additional steps cause the control system to open the hydraulic valves and slowly close them to establish the valve preload (dead band) for both the pressure and return valves.

The rockshaft control lever is set to a position which defines the rockshaft cylinder volume of the tractor and therefore the valve gains and limits. A secondary control (load/depth mix) is then used to establish the draft sensor gain. When this procedure is completed, normalization equations are then determined from the range of movement of the input sensors and stored in EEPROM. At end of calibration, the system also stores the established valve gains and disables any sensors which were not connected to the system during calibration.

DETAILED DESCRIPTION

Figure 1:
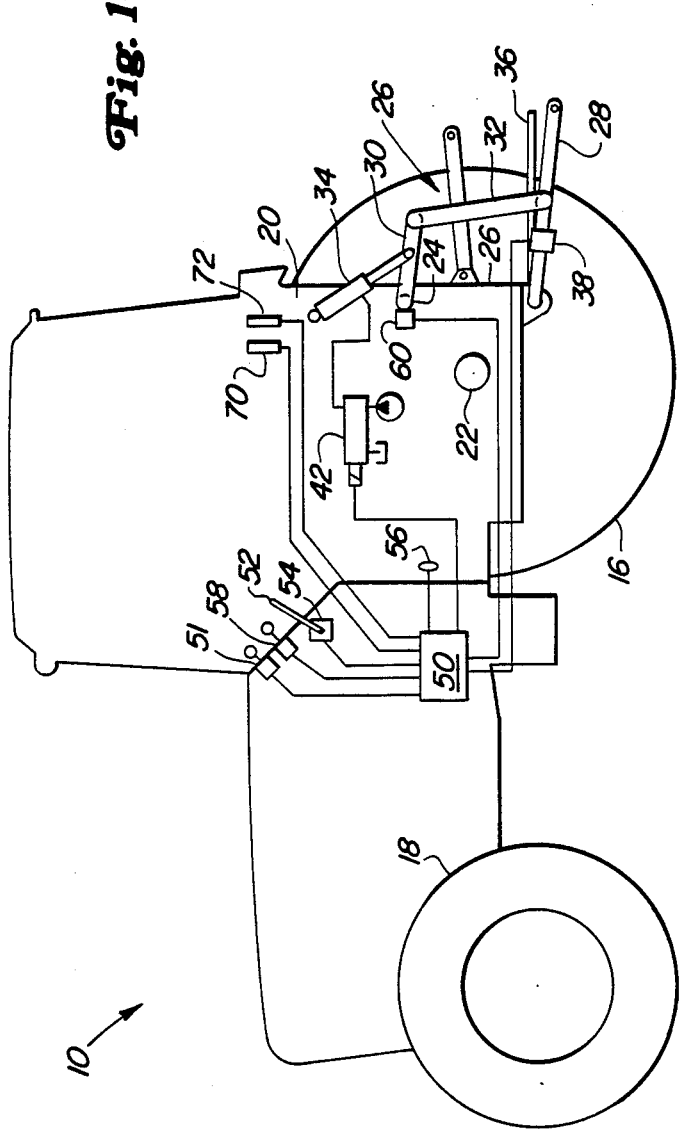
FIG. 1 is a simplified schematic of an agricultural tractor equipped with the present invention.

A tractor 10 includes a rear housing 20 which supports a rear axle 22 and rockshaft 24. An implement hitch 26, such as a conventional 3-point hitch, includes draft links 28 which are connected to lift arms 30 via lift links 32. The lift arms 30 are connected to the rockshaft 24 to ensure simultaneous and equal movement, and are raised and lowered via a pair of parallel connected hydraulic lift or rockshaft cylinders 34. A drawbar 36 extends rearwardly from the housing 20. The tractor 10 and the hitch 26 are merely exemplary and those skilled in the art will understand that the invention can be applied to tractors and hitches of other configurations and to other control systems, such as engine control systems. For example, this invention can be used on an articulated four-wheel drive tractor or on a front-wheel drive row-crop tractor.

An integral-type, ground-engaging implement, (not shown), such as a moldboard plow or a chisel plow, may be attached in a conventional manner to the draft links 28. Alternatively, a towed implement (not shown) may be coupled to the drawbar 36. A draft sensor 38 may be interposed in a strap (not shown) which replaces the hydraulic draft force sensing cylinder of the conventional production hydromechanical hitch system to sense the draft force transmitted to the draft links 28 from the integral implement. The draft sensor could also be placed in any draft link or a link connected thereto. In the case of a towed implement, the draft force may be sensed with a draft sensor interposed in the drawbar 36, or with a T-bar coupled to the draft links. In either case, any suitable known draft sensor would suffice, such as the Model GZ-10 manufactured by Revere Corporation of America.

The communication of hydraulic fluid to and from the cylinder 34 or to and from a remote cylinder (not shown) on a towed or semi-integral implement is controlled by a pair of solenoid-operated electrohydraulic flow control valves 42a and 42b which receive electrical control signals generated by a control unit 50. The flow control valves 42 may be such as described in U.S. patent application Ser. No. 145,345, filed Jan. 19 January 1988, which is incorporated by reference herein, or a commercially available alternative.

An operator-controlled command lever 52 is coupled to a lever transducer 54 (such as a potentiometer) which generates a command signal which represents a desired hitch position or a desired draft load, or a combination thereof, depending upon the setting of a load/depth or mix control potentiometer 56. An electrical upper position limit signal is provided by an operator-adjustable potentiometer 51. Also provided is an operator-adjustable drop rate potentiometer 58.

A position transducer 60, such as a conventional rotary potentiometer, generates a sensed position signal which represents the actual sensed position of the rockshaft. A position feedback signal could also be obtained from the lift cylinder 34 or from a remote lift cylinder if that cylinder includes a position transducer, such as described in U.S. Pat. No. 3,726,191, for example.

Also, a double pole, double throw raise/lower switch 70 may be mounted outside of the tractor cab near the hitch 26 so that an operator can raise and lower the hitch from outside of the tractor cab. A calibration switch 72 is mounted in the tractor cab.

Figure 2:
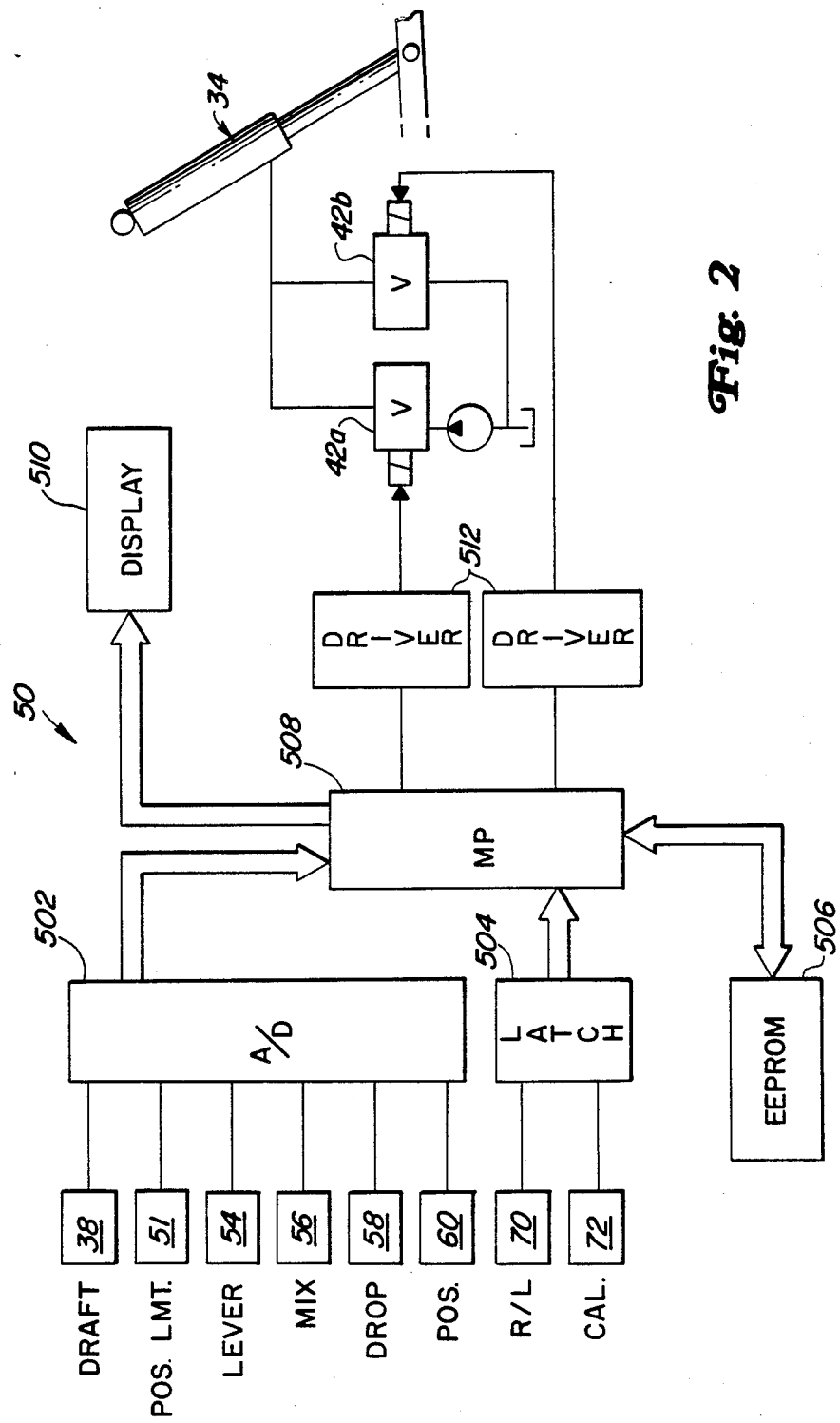
FIG. 2 is an electrical and hydraulic schematic diagram of the present invention.

Referring now to FIG. 2, the control unit 50 includes an analog-to-digital converter 502, a latch 504, an electrically erasable, programmable read only memory EEPROM 506, a microprocessor 508 with an integral timer (not shown), a display device 510 and a pair of valve drivers 512. The valve drivers could be any conventional pulse-width modulated valve current driver, or other commercially available type solenoid valve driver, but is preferably of the type described in co-pending U.S. patent application Ser. No. 294,527, filed Jan. 11, 1989, which is incorporated by reference herein. The analog signals from sensor/potentiometers 38, 51, 54, 56, 58 and 60 are coupled to the microprocessor 508 via analog-to-digital converter 502. Latch 504 couples raise/lower switch 70 and calibration switch 72 to microprocessor 508. EEPROM 506 stores calibration data used in a calibration method which is the subject of this invention.

The control unit 50 executes a hitch control algorithm such as is described in detail in co-pending U.S. patent application Ser. No. 294,522, filed Jan. 11, 1989, which is incorporated by reference herein. The control unit 50 also executes a calibration and configuration computer program which is included in the computer program listing contained in the microfiche appendix hereto. The following is a description of the calibration and configuration technique which comprises the present invention.

The calibration and configuration software provides a draft sensing configuration option wherein the hitch control system can be configured with one, two or no draft sensors 38. If no draft sensors 38 are selected, the system will not provide a load sensing option. The draft sensor gain can be selected by the technician during calibration. The no-load draft sensor zero is read and recorded during the calibration procedure. If two draft sensors are available, the hitch control system will use the average of these two sensors as its draft load. The system also includes a rear raise/lower switch option wherein the rear raise/lower switch 70 option can be detected by the calibration program. If no switch 70 is present, this option will be removed.

In a rockshaft cylinder volume selection configuration option, the valve parameters which control rate of flow and rate of change of flow can be adjusted during calibration so that the hitch can be "sized" for different volumes of the rockshaft cylinder (not shown). In addition, some customization of flow rates can be done to match the hitch to special needs.

In a valve preload measurement configuration option, the calibration determines the current required to overcome the preload of the control valve 42a, 42b. This value is "saved" and used to provide an adder to all valve commands during normal operation. This provides a means of reducing the system hysteresis caused by the control valves.

In an automatic sensor spanning calibration function, the range of output voltage from each of the sensors 51, 54, 56, 58 and 60 connected to the hitch control system are automatically determined when the calibration procedure is executed. This provides a self-adjustment method which provides freedom from the requirement to do mechanical adjustments of the sensor linkage. It also provides the flexability to use different sensor ranges for different tractor models.

Because the calibration procedure requires the operation of all control system elements, the control system is functionally tested during the calibration procedure.

The calibration procedure is a special mode of operation which is activated by the calibration selector switch 72. This switch can be located anywhere on the tractor, but is preferably located in the tractor cab. Once calibration mode is selected, a technician can configure the hitch control system by following a special calibration procedure. At the end of calibration, the calibration switch 72 must be turned to normal mode which will cause the calibration program to record the calibration data into the non-volatile memory 506 (EEPROM). These calibration data will include slope and intercept type information for all input sensors, as well as rockshaft cylinder volume adjusted valve parameters.

A calibration timer (not shown) is also incorporated so that switch bounce and wiring harness faults will not cause loss of calibrations. This feature can be used to recall previous calibrations to determine cause of hitch system malfunctions.

The hitch calibration program is called by a main control loop when the calibration input switch 72 is turned to calibration mode. When the calibration mode switch is returned to normal mode, the calibration information is stored into the permanent memory 506 (EEPROM). This calibration data is then used by the normal algorithm to normalize the input data of all sensors. The normalization equation is of the form:

$$Y = M \times (X - B)$$

where

Y is the normalized output,
M is the slope determined by the calibration routine,
X is the sensor input read by the analog input device, and
B is the X-intercept (or sensor zero reading) stored by the calibration routine.

In addition, the algorithm initialization routine can detect uncalibrated sensors and flag them for the normal algorithm to ignore. Valve parameters set by the calibration routine will provide valve gains and valve current limit values as well as offsets required to overcome the valve preloads.

When the calibration switch 72 is in calibration mode, the calibration program will monitor all sensor inputs. These inputs will be compared to a stored minimum and maximum table which is used to provide a minimum and maximum sensor reading on all sensors during the duration of the calibration. When calibration is complete, these readings are used to establish a sensor calibration which will be used by the normal control algorithm. The value of these minimums and maximums are used to determine the presence of optional sensors. The minimum and maximums are used differently for draft sensors 38 than for all other sensors.

The average of the minimum and maximum of each draft sensor 38 is used to establish a draft zero reading. The draft sensor slope is "entered" by the operator by the setting of the mix control 56 at the end of calibration. If draft sensor minimum and maximum readings differ by more than 0.5 volts, the draft sensor 38 will be considered failed. The draft sensor maximum zero reading and the draft sensor slope are used to "project" the sensor reading at 133% of rated draft. If this value would exceed 4.69 volts, the draft sensor 38 will be considered failed. Likewise, if the draft sensor minimum zero reading and the draft sensor slope would give a projected reading at −67% of rated draft of less than 0.31 volts, the sensor will be considered failed. Since failed sensors will be disabled by the main algorithm, an "out-of-range" zero reading can be used to indicate no sensor present. This can be achieved by grounding the sensor input.

For non-draft sensor inputs, the sensor minimum and maximum are used to develop a zero and slope for a normalization routine of the main algorithm. The difference between the sensor minimum and sensor maximum must be greater than 1.5 volts or the sensor will not be calibrated. If sensor minimums are less than 0.31 volts or if sensor maximums are greater than 4.69 volts, the sensor will be considered failed. If the range of sensor movement is less than 0.5 volts, the sensor will be considered uncalibrated and the previous calibration will be retained. If the range of sensor movement is greater than 0.5 volts but less than 1.5 volts, the sensor will be considered failed and no calibration data will be stored. As for draft sensors, failed other types of sensors will be disabled by the main algorithm, so "out-of-range" zero readings can be used to define sensor options. This can be achieved by grounding the sensor input.

The rear raise/lower switch 70 has one normally closed and one normally open contact for each position (raise or lower). If no switch is present, these inputs will be all open. This condition is used as a flag to tell the algorithm that the rear raise/lower switch option is not present.

In order to determine the minimum and maximum sensor readings on the control inputs 51, 54, 56, 58, the controls are moved through their full range of movement. However, the hitch position sensor 60 can best be moved through its range of movement by means of the hitch control system. Likewise, the valve preloads can best be determined by applying a known current and measuring the flow rate of the valves 42a or 42b. This can be accomplished on the tractor by using the hitch control system to apply the current and measuring the flow rate with the hitch position sensor 60. The adjustment of the custom raise rate can also be done by adjusting the hitch control system to obtain the desired raise rate and then "locking" it in.

Hitch movement for normal calibration is accomplished by using the rockshaft control lever 52 in "open loop" mode. That is, lever positions in the lower half of the lever slot (not shown) will cause the return valve 42b to open and lever positions in the upper half of the slot will cause the pressure valve 42a to open. The command is proportional to the distance from the center of the slot. Therefore, the valve command is variable from "off" at the center to "full on" at either end. With this type of valve control, the hitch 26 can be made to raise and lower in a controlled manner so that the calibration routine can read the minimums and maximums from the hitch position pot 60.

Valve preload currents are determined by opening the valve 42a or 42b until hitch movement is achieved and then closing the valve slowly until the movement stops. This preload calibration is activated by the operator. This can be done when the hitch 26 is at either limit and the lever 52 is at the same limit. Turning the raise limit 51 from end to end will activate the valve preload calibration. The valve being calibrated will depend on the hitch (and lever) position. A full up hitch will calibrate the return valve 42b, a full down hitch will calibrate the pressure valve 42a.

Raise rate (the rate at which the control system will move the hitch upwards) calibration can be adjusted by use of the drop rate control 58. This control allows two options. A normal mode is to move the drop rate control 58 end-to-end after the lever and hitch position pots have been calibrated and the valve preloads have been determined. This will provide the "standard" raise rate. A second mode is to move the drop rate control 58 as the first pot to be moved. This provides a "raise rate only" calibration mode of operation. When this mode is selected, no other calibrations are determined or stored. Since draft sensor zeroes and hitch position calibrations will not be recorded, this method of raise rate calibration can be done with an implement installed.

To operate this "raise rate only" mode, the following steps are performed:
1. Set the rockshaft control lever full forward.
2. Set the hitch into calibration mode. A code will be displayed confirming that the calibration mode has been selected.
3. Rotate the drop rate pot full counterclockwise, full clockwise and back to mid position. This will set the hitch controller to raise rate adjustment mode and set the raise rate to the standard value. A 235 will be displayed indicating the standard raise rate has been selected.
4. Move the rockshaft control lever full back and bring it full forward slowly. If the hitch is not full down, it should go full down at this time. The display should remain at 235.
5. Move the rockshaft control lever full back. The hitch will go full up at the standard raise rate. To establish a custom raise rate, rotate the drop rate pot in a clockwise direction to increase the rate, and in a counterclockwise direction to decrease the rate. More clockwise will increase the raise rate more and more counterclockwise will decrease the raise rate more. When the raise rate is less than the standard, the display will be 234 and when greater than the standard, the display will be 236. Continue to lower and raise the hitch until the desired raise rate is established. Note that when a heavy implement is used during this test, the lever should always be moved forward very slowly to prevent the implement from dropping too rapidly.
6. Return the hitch to normal (not calibrate) mode.

When the drop rate control is used to establish the raise rate, the hitch control lever 52 can be used in open loop mode to observe the rate at which the hitch 26 moves. The setting of the drop rate control 58 toward counterclockwise will reduce the raise rate and the setting toward clockwise will increase the raise rate. The setting of this control when raise rate evaluation is completed will establish the raise rate (valve current limits) to be stored.

In order to provide flexibility of the hitch configuration, two additional parameters are established. They are the rockshaft cylinder volume and the draft sensor gain (slope). The rockshaft cylinder volume (and associated valve gain terms) is established by the location of the rockshaft control lever 52 either at end of calibration or at the time the drop rate pot 58 is first calibrated. Note that if the rockshaft control lever 52 is not moved during a calibration, the valve gain terms will not be modified.

The draft sensor gain is only required on draft sensing hitches. Since the load/depth control 56 is likewise only required on these hitches, the load/depth control setting at end of calibration will establish the draft sensor gain value.

In order to achieve the flexability of this calibration procedure, the program monitors all sensor inputs and determines the one that was most recently moved. This control is then considered active so that the hitch operation will reflect the output associated with that input. Controls during calibration are quite similar to controls during normal operation so that the calibration technician will achieve hitch operation similar to that which would be expected. For example, the only controls that can move the hitch 26 are the main control lever 52 and the raise limit control 51. The hitch will move down with the lever forward and up with the lever rearward. A rotation of the raise limit control 51 counterclockwise will lower the hitch 26 in calibration as well as in normal operation and likewise, clockwise raises the hitch 26 in both cases. The movement of any control other than the active control will turn the hitch output off. The hitch lever 52 must be "unlocked" by moving through zero in order to move the hitch 26.

To operate this calibration and configuration technique, an operator performs the following steps:

1. Set the rockshaft control lever full forward.
2. Set the hitch into calibration mode. A code will be displayed confirming that the calibration mode has been selected.
3. Move the rockshaft control lever full back and full forward. If the hitch is not full down, it should go full down at this time. Either 164 or 165 will be displayed.
4. Move the rockshaft control lever full back. The hitch should go full up at this time. The display will be 100.
5. With the hitch full up, use the raise limit control to determine the return valve preload. Rotate the raise limit to the full counterclockwise position and back to the full clockwise position. Again move the control to the full counterclockwise position as you observe the hitch. The hitch should move at least one-fourth down and then stop. If the hitch does not go down, move the raise limit control back to mid range and again to the full counterclockwise position. After the hitch has moved down and stopped, the display will change from a number greater than 100 to a number less than 100. This indicates that the return valve preload has been determined.
6. Move the rockshaft control lever full forward and again full rearward. The hitch will come full up. The display will be 100.
7. With the hitch full up, use the raise limit control to set the return valve preload. Rotate the raise limit from the full counterclockwise position back to the full clockwise position. This will recall the return valve preload recorded in step 5. Move the control to the full counterclockwise position and observe the hitch. The hitch will move at least one-fourth down and then stop. After the hitch has moved down and stopped, the display will change from a number greater than 100 to a number less than 100. This indicates the preload has been determined.
8. Move the rockshaft control lever full forward. The hitch will go full down. The display will be 165.
9. With the hitch full down, use the raise limit control to determine the pressure valve preload. Rotate the raise limit to the clockwise position and back to the full counterclockwise position. Again move the control to the full clockwise position and observe the hitch. The hitch should move at least one-fourth up and then stop. If the hitch does not move up, move the raise limit control back to mid range and again to the full clockwise position. After the hitch has moved up and stopped, the display will change from a number greater than 100 to a number less than 100. This indicates that the pressure valve preload has been determined.
10. Move the rockshaft control lever full rearward and again full forward. The hitch will go full down. The display will be 165.
11. With the hitch full down, use the raise limit control to set the pressure valve preload. Rotate the raise limit from the full clockwise position back to the full counterclockwise position. This will recall the pressure valve preload recorded in step 9. Move the control to the full clockwise position and observe the hitch. The hitch will move at least one-fourth up and then stop. After the hitch has moved up and stopped, the display will change from a number greater than 100 to a number less than 100. This indicates the preload has been determined.
12. Move the rockshaft control lever full back. The hitch will come full up. Move the rockshaft control lever slowly forward while observing the display. Set the lever to achieve the rockshaft volume index number which is appropriate for the tractor being calibrated. Leave it in this position until calibration is completed. The following table sets forth the index codes which are displayed for different numbers of lift assist cylinders.

| Tractor | No. of Lift Cyl. | Display |
|---|---|---|
| Row-crop | 0 | 127 |
|  | 1 | 129 |
|  | 2 | 131 |
| 4-WD | NA | 137 |

13. Rotate the drop rate pot to full counterclockwise and back to full clockwise. A 235 will display, indicating that the drop rate pot has been calibrated.
14. (With draft sensing only): Rotate the load/depth mix control to the full counterclockwise position, then to the full clockwise position. The tractor will display 233. This number indicates the position of the mix control. While observing the display, adjust the mix control to display the draft sensor span index number of 183.
15. If the above procedure was correctly followed and errors were detected during calibration, proceed to Step 17.

16. If problems have occurred in attempting to follow this procedure and you do not wish to update the hitch controller calibration memory, turn the tractor keyswitch off before returning the hitch to normal (not calibrate) mode. This will abort the calibration procedure and restore the calibration memory to that which was present prior to this operation.

17. Return the hitch to normal (not calibrate) mode.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations will fall within the spirit and scope of the appended claims.

We claim:

1. In a hitch control system having a command lever movable within a predetermined range of positions, a lever position sensor generating lever position signals, a control unit coupled to the sensor and generating control signals as a function of the sensed lever positions, and an actuator movable in response to the control signals, a calibration method comprising:

moving the lever through its entire range of positions;

automatically determining a range of magnitude of the lever position signals corresponding to the range of positions through which the lever is moved; and automatically adjusting the control unit as a function of the determined range of magnitude of the lever position signals.

* * * * *

UNITED STATES PATENT AND TRADEMARK OFFICE
CERTIFICATE OF CORRECTION

PATENT NO. : 4,931,967
DATED : June 5 1990
INVENTOR(S) : Thomas Eugene Boe It is certified that error appears in the above-identified patent and that said Letters Patent is hereby corrected as shown below:

On the title page inventor should read

--(75) inventor: Thomas E. Boe--

Item (19) "et al" should be deleted

Signed and Sealed this

Seventeenth Day of December, 1991

*Attest:*

HARRY F. MANBECK, JR.

*Attesting Officer*      *Commissioner of Patents and Trademarks*